US012699783B2

(12) United States Patent　　　　(10) Patent No.: US 12,699,783 B2
O'Mahony et al.　　　　　　　　　(45) Date of Patent: Aug. 4, 2026

(54) ENCRYPTING DATA AT REST AND DATA IN MOTION WITH TRUSTWORTHY ENERGY AWARENESS

(71) Applicant: Dell Products L.P., Round Rock, TX (US)

(72) Inventors: Aidan O'Mahony, Cork (IE); Ahmed Khalid, Cork (IE); Alan Barnett, County Cork (IE); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 18/421,167

(22) Filed: Jan. 24, 2024

(65) Prior Publication Data

US 2025/0238528 A1　　Jul. 24, 2025

(51) Int. Cl.
　　*G06F 21/60*　　　　(2013.01)
(52) U.S. Cl.
　　CPC ................................. *G06F 21/602* (2013.01)
(58) Field of Classification Search
　　None
　　See application file for complete search history.

(56) References Cited

U.S. PATENT DOCUMENTS

| | | | |
|---|---|---|---|
| 6,253,246 B1 | 6/2001 | Nakatsuyama | |
| 6,345,101 B1 * | 2/2002 | Shukla | H04L 9/0662 |
| | | | 380/255 |

| | | | |
|---|---|---|---|
| 6,351,686 B1 | 2/2002 | Iwasaki et al. | |
| 7,185,138 B1 | 2/2007 | Galicki | |
| 8,185,712 B2 | 5/2012 | Sarkar et al. | |
| 8,510,573 B2 * | 8/2013 | Muller | H04L 63/0428 |
| | | | 713/502 |
| 9,037,672 B2 | 5/2015 | Chang et al. | |
| 9,239,794 B1 | 1/2016 | Merchant | |
| 10,394,453 B1 | 8/2019 | Bigman | |
| 10,715,176 B1 | 7/2020 | Singh et al. | |
| 11,829,600 B2 | 11/2023 | Mizushima et al. | |
| 2002/0026543 A1 | 2/2002 | Tojima et al. | |
| 2003/0217246 A1 | 11/2003 | Kubota et al. | |

(Continued)

OTHER PUBLICATIONS

Cherubini, et al, "Data Prefetching for Large Tiered Storage Systems," 2017 IEEE International Conference on Data Mining (ICDM), New Orleans, LA, USA, 2017, pp. 823-828.

(Continued)

*Primary Examiner* — Paul R Fisher
(74) *Attorney, Agent, or Firm* — Workman Nydegger

(57) ABSTRACT

Energy aware data encryption operations are disclosed. An awareness engine includes models configured to generate a recommendation that includes an encryption time and/or an encryption model. When the encryption operation is a data at rest encryption operation, the data is encrypted in accordance with the recommendation and stored at the storage system. When the encryption operation is a data in motion encryption operation, the data is encrypted and transmitted to a target storage system in accordance with the recommendation. At the target storage system, the encrypted may be stored in an encrypted form or decrypted and stored. The recommendations are configured to account for energy considerations including energy cost and/or energy source.

20 Claims, 5 Drawing Sheets

(56) References Cited

U.S. PATENT DOCUMENTS

| | | | |
|---|---|---|---|
| 2007/0011380 A1 | 1/2007 | Kawai et al. | |
| 2007/0096954 A1 | 5/2007 | Boldt et al. | |
| 2009/0100470 A1 | 4/2009 | Yai et al. | |
| 2009/0135700 A1 | 5/2009 | Fujibayashi | |
| 2009/0281847 A1 | 11/2009 | Hamilton et al. | |
| 2009/0282273 A1 | 11/2009 | Hamilton et al. | |
| 2010/0070888 A1 | 3/2010 | Watabe et al. | |
| 2012/0106334 A1 | 5/2012 | Tanaka | |
| 2012/0303788 A1 | 11/2012 | Heinrich et al. | |
| 2013/0275794 A1 | 10/2013 | Annavaram et al. | |
| 2013/0339468 A1 | 12/2013 | Chang et al. | |
| 2015/0149130 A1 | 5/2015 | Chiu et al. | |
| 2015/0282039 A1 | 10/2015 | Park et al. | |
| 2016/0148100 A1 | 5/2016 | Chang et al. | |
| 2016/0344646 A1 | 11/2016 | Wang et al. | |
| 2017/0060633 A1 | 3/2017 | Suarez et al. | |
| 2017/0064632 A1 | 3/2017 | Ohshima et al. | |
| 2017/0244969 A1 | 8/2017 | Wongpaisarnsin et al. | |
| 2018/0219965 A1 | 8/2018 | Yellin et al. | |
| 2018/0307640 A1 | 10/2018 | Motai et al. | |
| 2018/0330767 A1 | 11/2018 | Lea et al. | |
| 2020/0167190 A1 | 5/2020 | Bernat | |
| 2020/0185058 A1 | 6/2020 | Song et al. | |
| 2020/0201574 A1 | 6/2020 | Nagata et al. | |
| 2020/0311287 A1 * | 10/2020 | Kaul | G06F 21/602 |
| 2020/0387518 A1 * | 12/2020 | Kesarwani | G06F 21/602 |
| 2020/0401405 A1 | 12/2020 | Lasch et al. | |
| 2020/0403633 A1 | 12/2020 | Lasch et al. | |
| 2021/0026707 A1 | 1/2021 | Rosenberg | |
| 2021/0300401 A1 | 9/2021 | Hashimoto et al. | |
| 2021/0342673 A1 | 11/2021 | Shah et al. | |
| 2021/0342733 A1 | 11/2021 | Kotler et al. | |
| 2021/0344549 A1 | 11/2021 | Babington et al. | |
| 2022/0066647 A1 | 3/2022 | Krasner et al. | |
| 2022/0210218 A1 | 6/2022 | Nomura et al. | |
| 2023/0122901 A1 | 4/2023 | Wang et al. | |
| 2023/0305703 A1 | 9/2023 | Zamir et al. | |
| 2024/0086328 A1 | 3/2024 | Vazhkudai et al. | |
| 2024/0086711 A1 | 3/2024 | Wilkins et al. | |
| 2024/0129380 A1 | 4/2024 | Ganju et al. | |
| 2024/0163251 A1 | 5/2024 | Karas | |
| 2025/0244910 A1 | 7/2025 | Rolo | |

OTHER PUBLICATIONS

Shah et al, "Energy aware routing for low energy ad hoc sensor networks," 2002 IEEE Wireless Communications and Networking Conference Record. WCNC 2002 (Cat. No. 02TH8609), Orlando, FL, USA, 2002, pp. 350-355 vol. 1.

* cited by examiner

ENCRYPTING DATA AT REST AND DATA IN MOTION WITH TRUSTWORTHY ENERGY AWARENESS

FIELD OF THE INVENTION

Embodiments of the present invention generally relate to systems and methods for encrypting and/or decrypting data. More particularly, at least some embodiments of the invention relate to systems, hardware, software, computer-readable media, and methods for encrypting data at rest and/or data in motion with energy awareness.

BACKGROUND

Data encryption typically refers to the process of encoding data from plaintext to ciphertext and data decryption refers to the process of generating the original plaintext from the ciphertext. Encryption can prevent unauthorized users from accessing or viewing the original data in plaintext. Advanced encryption standard (AES) is an example of a symmetric encryption algorithm and public key cryptography is an example of asymmetrical encryption.

Data at rest encryption (DARE) relates to the encryption of data that is stored in a storage system (e.g., in a database) and is not moving through networks. In certain storage arrays multiple options exist to encrypt data. Hardware-based encryption methods are often chosen as they are specifically designed for low latency encryption and for offloading computations from the CPU. However, encryption methods do not account for the energy required to encrypt the data.

Data in motion encryption (DIME) is the process of encrypting data for transmission between two or more points (e.g., from a source storage array to a target storage array). In the context of data in motion encryption, the encryption/decryption operations are performed by an encryption/decryption module (e.g., a cryptographic Application-Specific Integrated Circuit (ASIC)), which is configured specifically for the purpose of encryption/decryption operations. Similar to data at rest encryption/decryption operations, the encryption/decryption operations performed in data in motion operations are performed without accounting for the energy required to perform these operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to encrypting data at rest and/or encrypting data in motion. More particularly, at least some embodiments of the invention relate to systems, hardware, software, computer-readable media, and methods for encrypting/decrypting data with energy awareness. Energy awareness may include encrypting/decrypting data when energy costs are low, to encourage or consume green (e.g., renewable) energy, or other energy related.

Storage systems, including storage arrays, are generally configured to store data. For various reasons, data may be stored in an encrypted form. If the data is required by an application, the data may be decrypted. Encryption operations consume energy when performed.

Embodiments of the invention relate to encrypting data in an energy aware manner. Embodiments of the invention are discussed in the context of data encryption, but may be applied to data decryption. Embodiments of the invention relate to encrypting data at rest and to encrypting data in motion in an energy aware manner. The encryption operation may be performed in a manner that accounts for energy considerations, such as energy source, energy cost, grid conditions, or the like. Embodiments of the invention advantageously improve encryption operations by accounting for the time required to perform the encryption operation, a time to initiate or start the encryption operation, energy use, energy cost, energy sources, and/or other considerations.

Figure 1:
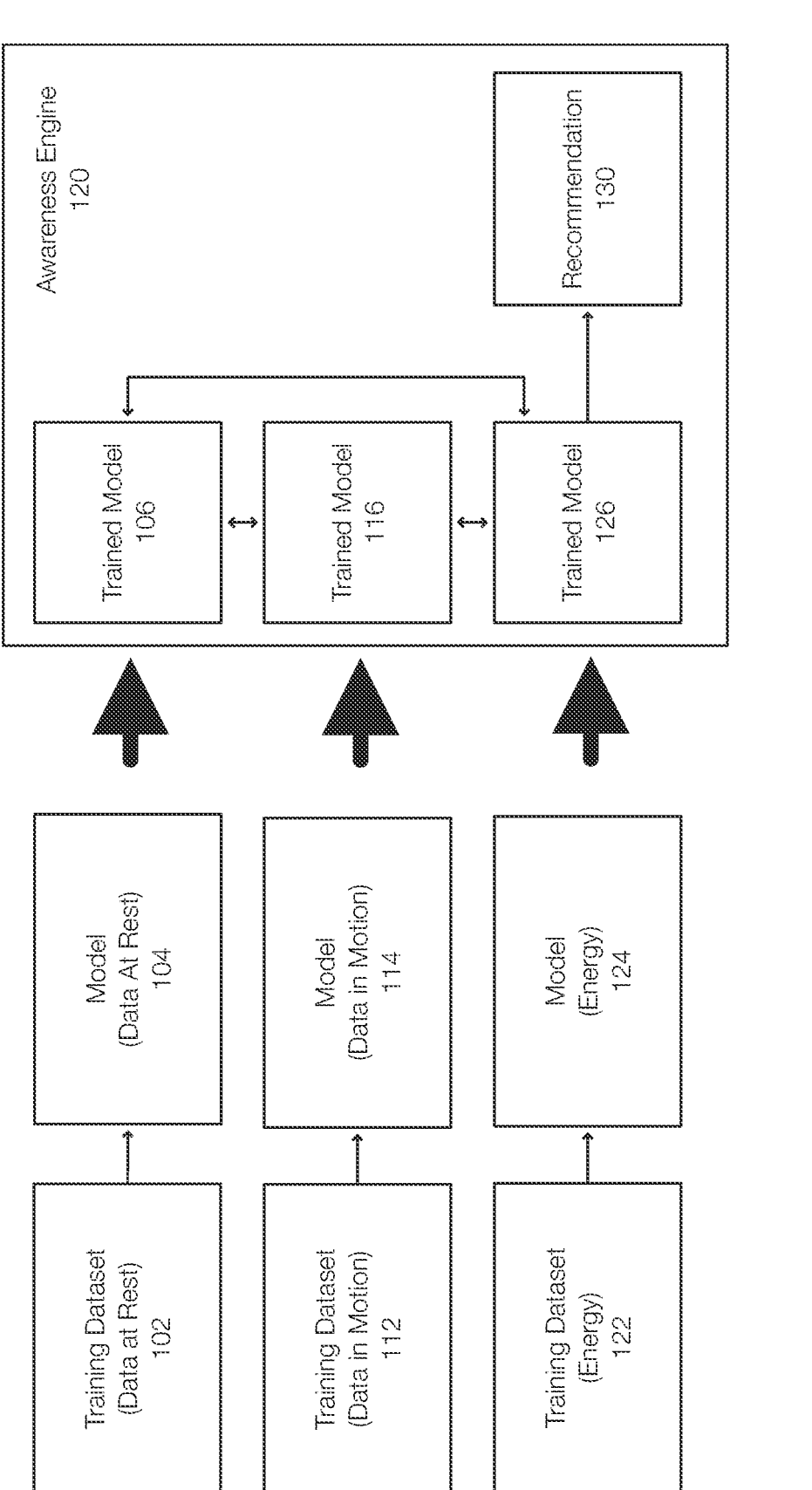
FIG. 1 discloses aspects of machine learning models configured to determine recommendations that include encryption times and recommended encryption modules in the context of energy sources/costs.

FIG. 1 discloses aspects of encrypting data with energy awareness. FIG. 1 generally relates to (i) a model 106 configured to estimate or predict a recommendation for data at rest encryption, which recommendation may include a time required to perform the encryption operation, a time at which the encryption operation may be started, and/or a recommended encryption module, (ii) a model 116 configured to estimate or predict a recommendation for data in motion encryption, which recommendation may include a time required to perform the encryption operation, a time at which to start the encryption operation, and/or a recommended encryption module, and (iii) a model 126 configured to estimate aspects of energy awareness such as energy cost for one or more starting times or time windows. The models 106 and 116 may also be configured to identify an encryption module or algorithm.

These models may be independent or combined. For example, a model may be trained to account for whether the encryption operation is a data at rest encryption operation or a data in motion encryption operation for purposes of determining an encryption time and/or an encryption module. The encryption time and/or encryption module recommended by the models 106 and/or 116 may be input to the energy model 126 such that the recommended encryption time and encryption module are energy aware.

For example, the encryption time generated by the model 106 may indicate that an hour is required to encrypt the data at rest or in motion using a particular encryption module. The model 126 may predict energy costs for various times (e.g., the next 6 hours). This may enable the encryption operation to begin at an appropriate time to account for energy considerations or when energy cost is lowest or when renewable energy is being contributed to the grid.

More specifically, FIG. 1 illustrates a model 104, a model 114, and a model 124 that are trained, respectively, with training datasets 102, 112, and 122, to generate trained models 106, 116, and 126. The training dataset 102 includes historical data related to previously performed (historical) data at rest encryption operations that can be used to train the model 104 to predict or estimate an encryption time (e.g., duration, and starting time of the encryption operation). The training dataset 102 may include information (e.g., features) describing or related to data that was encrypted that may include, but are not limited to, size of the data to be encrypted, time required to access the data, storage system features, available memory or computing resources, recommended encryption type or module, features of the network, geographic location of the data being encrypted, or the like. This information or various combinations thereof resulted in a trained model 106 configured to predict or estimate a time required to encrypt the data, a time to start the encryption operation, and/or a recommended module to perform the encryption operation.

The training dataset 112 may include historical data that can be used to train the model 114 and generate the trained model 116. The training dataset 112 may include historical aspects or features related to data in motion encryption operations. In addition to the features considered by the model 104, the model 114 may also consider aspects of the encryption operation such as features of the source storage and the target storage, network conditions, or the like. The features may include a data size of the data to be encrypted, source information (e.g., hardware specifications), target information, network information (e.g., bandwidth), location data of the source and the target storage systems, or the like. The trained model 116, which results from training the model 114, is capable of predicting or recommending an encryption time and/or an encryption module.

The training dataset 122 may include data that can be used to train the model 124. The training dataset 122 may include historical weather data, historical energy costs (renewable and nonrenewable), energy production data (energy produced from renewable/non-renewable sources), historical watt energy supplied to the grid from renewable and non-renewable sources, and the like.

The trained model 126 can, using current and/or forecasted weather data and/or current and/or forecasted energy data, predict, estimate, or infer an energy source, cost of energy, or the like at various points in time.

Generally, the models 106, 116, and 126 may generate predictions or estimates that allow decisions to be made regarding an encryption operation with energy awareness. In one example, outputs of the model 106 and/or the model 116 may be input to the model 126. The model 126 may generate a recommendation 130 that accounts for the encryption time, encryption location, encryption source/target, and/or energy characteristics or considerations. The models 106, 116, and 126 may be combined in other manners.

In another example, the model 106 may be configured to predict an encryption time for performing the encryption operation for either of a data at rest encryption operation and a data in motion operation and the model 116 is trained to recommend a specific encryption module or algorithm. When the model generates probabilities, the most likely encryption module and/or other potential encryption modules can be identified. As a result, the output of the awareness engine 120 may generate various combinations of encryption times/encryption modules that can be presented to the storage array. The storage array can select the combination from among the recommended combinations.

Generally, regardless of how the models 106, 116, and 126 interact or are connected, the awareness engine 120 may use the outputs of the trained models 106, 116, and 126 separately, in a chained manner, or the like, to provide recommendations regarding data at rest encryption operations and/or data in motion encryption operations.

The recommendation 130 generated by the awareness engine 120 may account for energy cost, energy source or the like, the source used for the encryption operation, the target of the encryption operation (which may also be the source storage system (for data in rest operations) or other remote storage (for data in motion operations)), and/or the encryption time. More specifically, the awareness engine 120 may recommend performing the encryption operation at a time when the energy cost is low or is expected to be low and that the encryption operation be initiated in a particular time window and that encryption should be performed using a particular encryption module.

If the awareness engine 120 is able to select the energy source or understand the potential energy costs, embodiments of the invention can balance encryption operations and energy costs. For example, a customer may desire to perform the encryption operation when a renewable energy source is contributing to the grid, even if more expensive. For example, a particular data storage array may be powered by renewable energy and a policy may be to use that energy source regardless of cost or as long as anticipated energy cost is below a threshold energy cost.

The models 106, 116, and 126 can be deployed to a data source such as a storage array or to an encryption engine. Embodiments of the invention also allow other policies to be considered when selecting a time for performing an operation for data.

Figure 2:
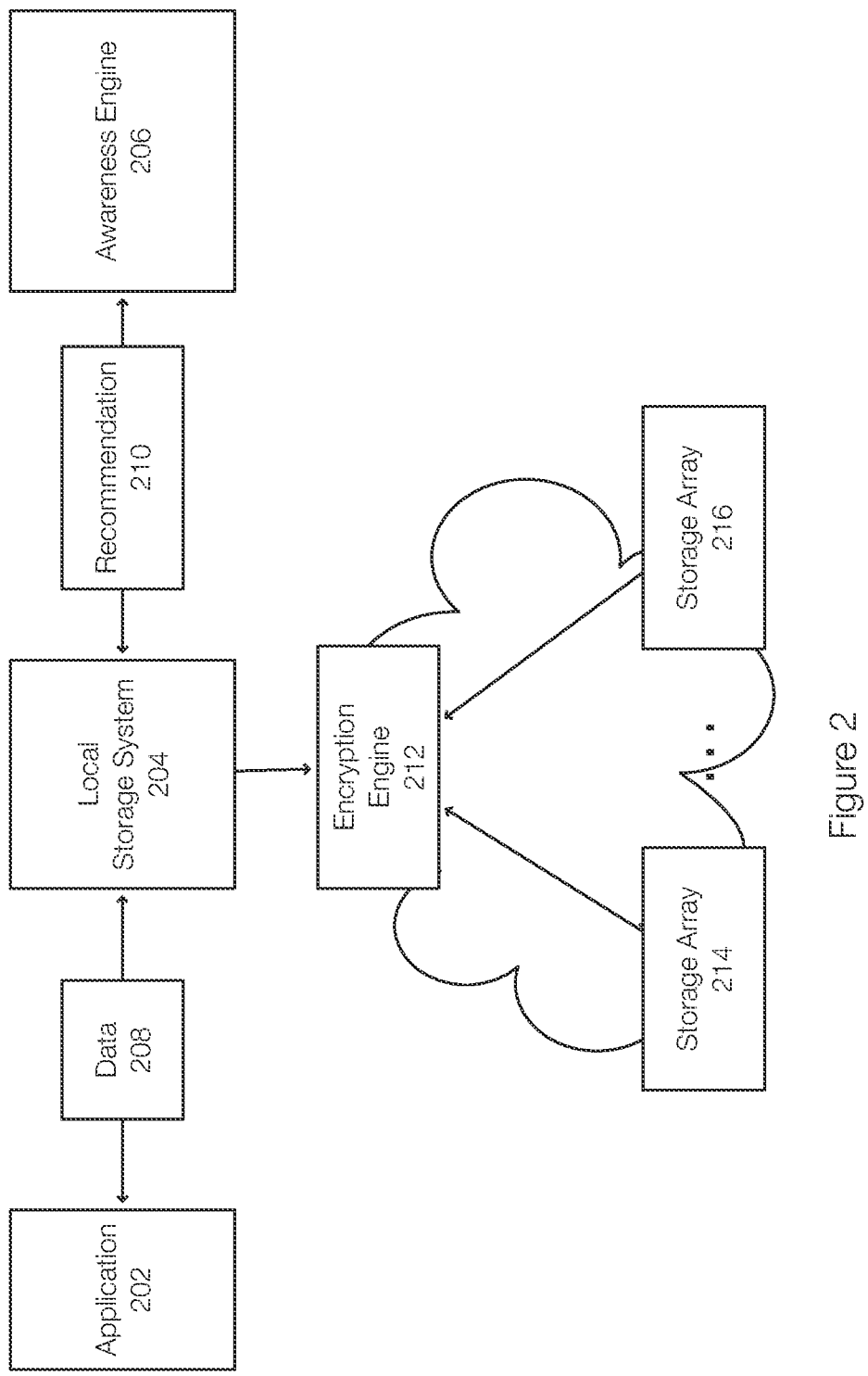
FIG. 2 discloses aspects of an energy aware data encryption/decryption system.

FIG. 2 discloses aspects of a system configured to encrypt data at rest and/or data in motion in an energy aware manner. FIG. 2 illustrates an application 202 that may read/write data 208 stored in a local storage system 204. The local storage system 204 may be associated with remote storage systems, represented by storage arrays 214 and 216. For example, the storage arrays 214 and 216 may be replicas of the local storage system 204 or may store snapshots or backups of the local storage system 204 or of the application 202.

The local storage system 204 may include or be associated with an encryption engine 212 that is configured to encrypt the data 208 in the process of committing the data 208 to storage in the local storage system 204 or when the data is at rest in the local storage system 204.

In another example, data stored in the local storage system 204 may not be encrypted. However, prior to being transmitted from the local storage system 204 to the storage array 214 or other target storage system, the data may be encrypted.

More generally, FIG. 2 represents scenarios where data at rest encryption operations and/or data in motion encryption operations are performed. Some embodiments may include only data at rest encryption while other embodiments may include only data in motion encryption.

Although the local storage system 204, encryption engine 212, and awareness engine 206 are illustrated separately, they may be integrated and be part of the same component, such as the storage system 204.

The models (e.g., models 106, 116, and 126) in the awareness engine 206 may be used to generate a recommendation regarding an encryption time and/or an encryption module. For example, in the context of a data at rest operation, the awareness engine 206 may predict a time required to perform a data at rest encryption operation, a time or time window in which to commence the data at rest encryption operation, and/or an encryption module. In another example, in the context of a data in motion encryption operation, the awareness engine 206 may recommend a time required to perform the data in motion encryption operation, a time or time window in which to commence the data in motion encryption operation, and/or a recommended encryption module.

Implementing the recommendation 210 generated by the awareness engine 206 may be performed by the encryption engine 212. If the recommendation 210 include various options, the encryption engine 212 may select an option from the recommendation 210. For example, if the recommendation 210 includes a time window, the encryption engine 212 may commence the encryption operation during the time window when available resources are above a threshold level. Alternatively, the application 202 (or customer) may make decision regarding the options included in the recommendation 210 provided by the awareness engine 206.

The recommendation 210 generated by the awareness engine 206 may include or account for an anticipated energy cost. Using current weather data (which may include forecasted weather data), energy costs, anticipated energy costs, energy production levels or anticipated energy production levels, source storage array locations, target storage array location, and/or other input, the models included the awareness engine 206 may enable the encryption engine 212 to select a best time to perform or commence the encryption operation. Weather forecasts, energy forecasts, and the like may allow the awareness engine 206 to generate multiple combinations of encryption times/energy costs. This allows the encryption engine 212 (or more generally the storage system 204 or application 202) to select a specific combination or option of encryption time/energy cost that suits multiple policies including an energy policy.

For example, the awareness engine 206 may indicate a first energy cost that leverages renewable energy production if the encryption operation commences at noon (the first encryption time). The awareness engine 206 may indicate a second cost when less renewable energy is being produced if the encryption commences at 1 pm. This presents several options. For example, the first cost may be higher than the second cost while, at the same time, the first encryption time requirement (time to perform the encryption operation) is longer than the second encryption time requirement. The encryption engine 212 may consider these predictions or estimates as well as other encryption policies when executing the encryption operation in light of the recommendation 210 generated by the awareness engine 206.

Thus, the storage system 204, or the encryption engine 212, may communicate with the awareness engine 206 to obtain a recommendation 210 or inference regarding a data at rest encryption operation and/or a data in motion encryption operation. In one example, the awareness engine 206 and the encryption engine 212 are part of or components of the storage system 204.

Figure 3A:
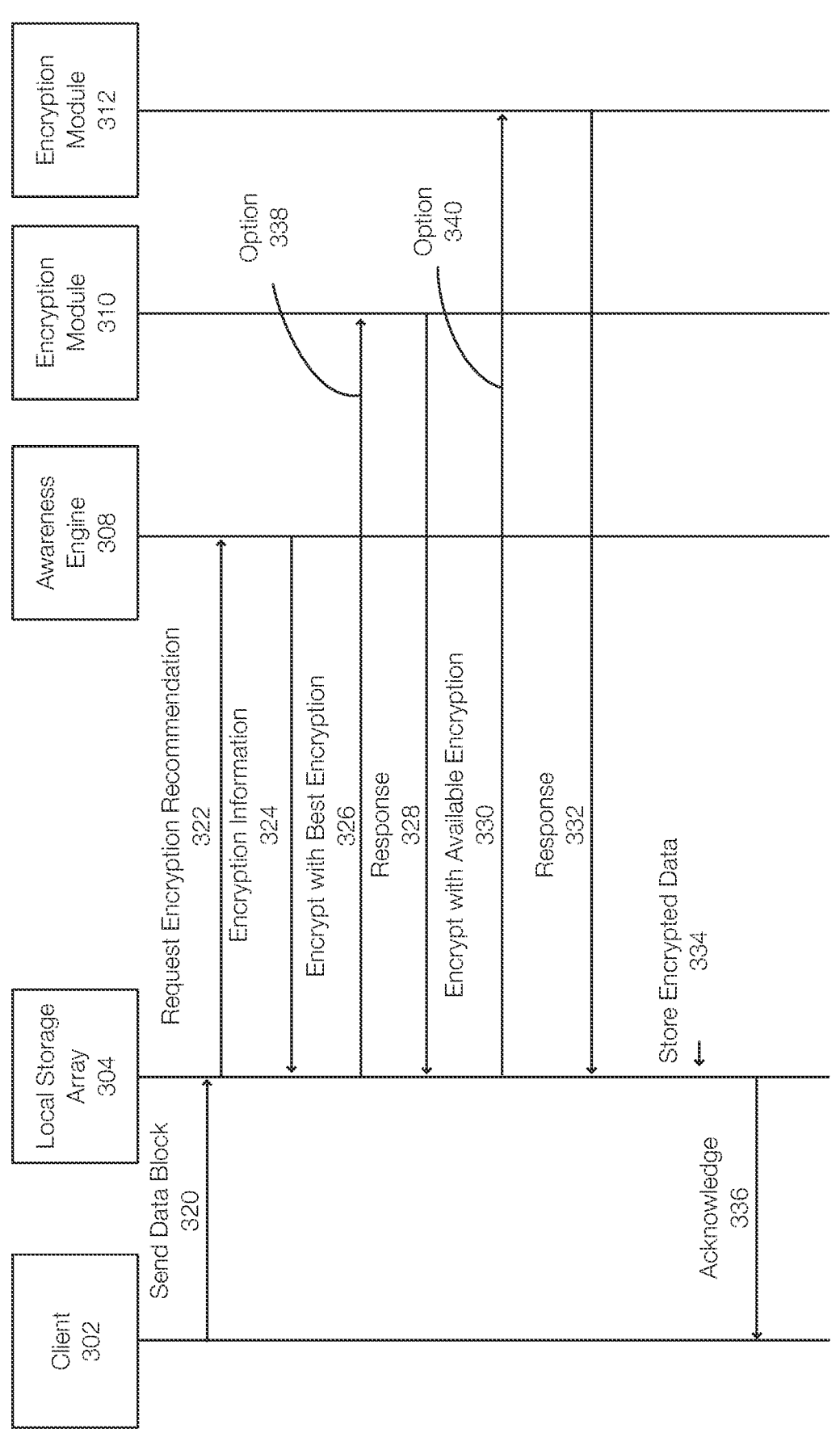
FIG. 3A discloses aspects of a method for energy aware data at rest encryption and/or decryption.

FIG. 3A discloses aspects of a method for performing a data at rest encryption operation. FIG. 3A illustrates a client 302 (e.g., a user, customer, application) and a local storage array 304. The client 302 may consume or use (read/write) data stored in the local storage array 304. For example, the client 302 may send 320 a data block to the storage array 304. The storage array 304 (or an encryption engine) may request an encryption recommendation 322 from an awareness engine 308. The awareness engine 308 is configured to recommend, to the local storage array 304, an encryption time and/or an encryption module. Thus, the encryption information 324 (or recommendation) returned by the awareness engine 308 may enable the storage array 304 to make a decision regarding the encryption operation.

In this example, the encryption module 310 may provide a best quality encryption, a high execution time and the encryption module 312 may provide a lower quality encryption at a lower encryption time. The storage array 304 may also be subject to other policies. For example, the encryption operation may need to be completed by a certain time. If the encryption time (time to perform the encryption operation) received from awareness engine 308 suggests that the encryption model 310 can meet this requirement, then the encryption module 310 is used to encrypt the data block and the encrypted block is returned in the response 328. If the encryption module 310 cannot satisfy the time requirement, an available encryption module, such as the encryption module 312 is used to encrypt the data block and the encrypted data block is returned in the response 332.

Thus, the storage array 304 may have options, as illustrated by the option 338 and the option 340. These options may also include energy awareness information or account for energy awareness. For example, the response or recommendation from the awareness engine 308 may provide energy costs associated with various encryption start times (or time windows) for each of multiple modules in which a lowest cost will be achieved or in which renewable energy is favored. The decision of which encryption module to use may depend on an energy policy (e.g., favor renewable energy), encryption quality, completion requirements, or the like. Thus, the storage array 304 or encryption engine may select an encryption module from one of various options included in the recommendation represented by the options 338 and 340.

For example, a policy associated with the client 302 may favor renewable energy even if energy cost is more. The awareness engine 308 may consider aspects related to the production of renewable energy such as current weather conditions (e.g., cloudy, time of day) or the like. In this example, the array 304 may be powered by renewable energy (or connected to a grid that uses renewable energy). If the weather is poor, the energy cost associated the storage array 304 may be above a threshold and, where possible, the encryption operation may be delayed. If the energy cost is not over a threshold cost, in one example, the encryption operation may be performed even if the energy cost using non-renewable energy is lower at a different time. Alternatively, the awareness engine 308 may consider the energy delivered to the grid generally from renewable and non-renewable energy sources.

More generally, the awareness engine 308 may be configured to estimate the cost of energy at various times. Thus, the awareness engine 308 may recommend a particular time or time window during which the encryption operation should be performed to incur the lowest energy cost. If multiple options are provided (e.g., multiple time windows and corresponding anticipated energy cost), the client 302 (or encryption engine) may be able to select the option that best satisfies all policies associated with the encryption operation. As previously stated, the ability to select any encryption option may be limited by the urgency of the request. For example, the request 320 may indicate that the data is required to be encrypted in the next 20 minutes (or other requirement) These factors may suggest that encryption is performed using any available encryption module regardless of the recommendation generated by the awareness engine.

Figure 3B:
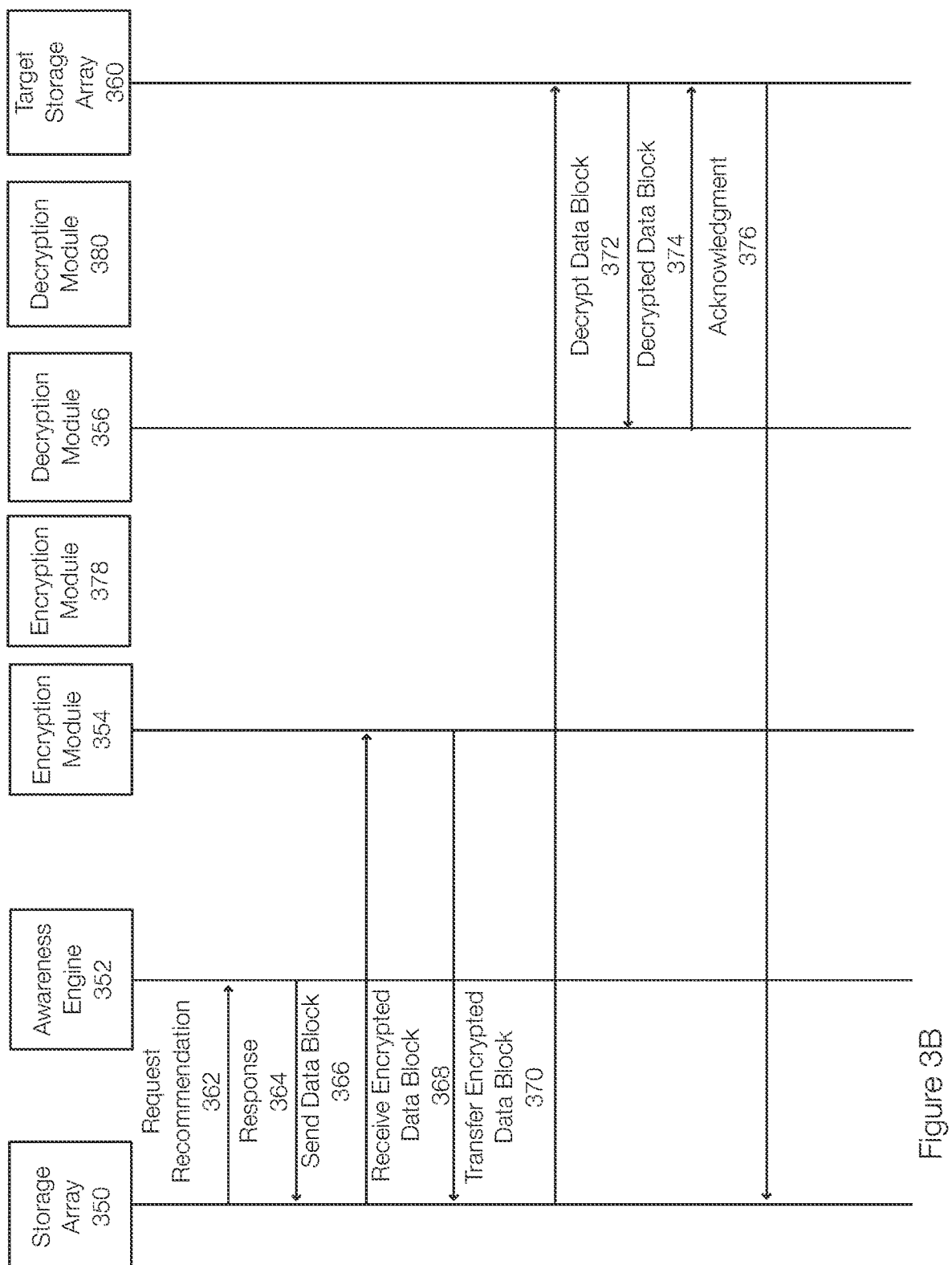
FIG. 3B discloses aspects of a method for energy aware data in motion encryption/decryption.

FIG. 3B discloses additional aspects of a data in motion encryption operation. The decryption in motion operation of FIG. 3B is described in the context a local storage array 350, an awareness engine 352, an encryption module 354, a decryption module 356, and a target storage array 360, which is remote from the target storage array.

The awareness engine 352 may identify or recommend one of multiple available encryption modules, an encryption time for each of the encryption modules, energy awareness data, or the like. Each of the encryption modules are associated with a corresponding decryption module. The storage array 350 may be able to select from one of multiple options.

In FIG. 3B, the storage array 350 requests 362 a recommendation from the awareness engine 352. The response 364 from the awareness engine 352 may identify different energy aware recommendations. In this example, the response 364 includes a recommendation to use the encryption module 354. Thus, the data block is sent 366 to the encryption module 356. The encrypted data block is received 368 by the storage array and the encrypted data block is transferred 370 to the target storage array 360, which also may have been recommended by the awareness engine 352.

The target storage array 360 uses a decryption module 356, which corresponds to the encryption module 354, to decrypt 372 the data block. The decrypted data block 374 is received and stored at the target storage array 360. An acknowledgment that the data block has been successfully decrypted and stored is provided to the source storage array 350. A similar method would be followed if the awareness engine 352 had recommended an encryption module 378 (and corresponding decryption module 380). Further, these may have been presented as options.

In this example, the encryption time recommended by the awareness engine 352 accounts for energy cost, energy source, aspects of the encryption operation, and/or the like. The recommendation may also account for or identify a target storage array when considering the energy considerations. For example, the encryption time may correspond to a time during which energy costs are reduced or less expensive. This may be based on current weather conditions, forecasted conditions, current energy production, forecasted energy prediction, or other conditions that may impact the cost of energy. In one example, the location of the energy source and/or the source/target storage arrays may also be considered. The recommended encryption time may correspond to a time when a renewable energy source is online and producing renewable energy.

Thus, the response or recommendation from the awareness engine 352 may account for the energy source and/or energy cost, source storage array, target storage array, or the like in providing the encryption time. The response or recommendation may, alternately, provide an energy assessment separately. For example, the response may identify anticipated energy costs for multiple times (multiple time windows). This allows the encryption engine to select an option that is cost-effective while also complying with or accommodating other policies. For example, it may be necessary to start an encryption operation within a certain time limit (e.g., before midnight). Thus, the encryption engine will select an option whose encryption time complies with this policy as well. The encryption models of the awareness engine 352, which may be trained to predict or infer energy cost based on weather data, grid data, and the like, allows the encryption operation to be performed in an energy aware manner.

As apparent from this disclosure, an embodiment of the invention may possess various useful features and aspects, although no embodiment is required to possess any of such features or aspects. Embodiments of the invention may include or relate to encryption operations, decryption operations, energy awareness related operations, energy aware encryption operations, data at rest encryption operations, data in motion encryption operations, or the like. Embodiments of the invention may relate to any operations related to encrypting data in an energy aware manner.

Following are some further example embodiments of the invention. These are presented only by way of example and are not intended to limit the scope of the invention in any way.

Embodiment 1. A method comprising: requesting a recommendation for performing a data at rest encryption operation to encrypt data at a storage system, wherein the recommendation is requested from an awareness engine that includes an encryption model configured to estimate an encryption time, wherein the recommendation includes the encryption time and/or an encryption module, encrypting the data using the encryption module recommended by an awareness engine and according to the encryption time, wherein the encryption time determined by the awareness engine accounts for an energy cost associated with performing the data at rest encryption operation, and storing the encrypted data at the storage system.

Embodiment 2. The method of embodiment 1, wherein the encryption time comprises an encryption time window and an estimated time to perform the encryption operation.

Embodiment 3. The method of embodiment 1 and/or 2, further comprising generating the encryption time by inputting features including weather features, and features of the storage system into a trained encryption module configured to predict the encryption time.

Embodiment 4. The method of embodiment 1, 2, and/or 3, further comprising waiting for the encryption time window to arrive prior to performing the encryption operation.

Embodiment 5. The method of embodiment 1, 2, 3, and/or 4, wherein the encryption time is generated by at least one machine learning model trained on data associated with historical data at rest encryption operations, historical energy costs, and factors influencing the energy costs.

Embodiment 6. The method of embodiment 1, 2, 3, 4, and/or 5, further comprising accounting for a source of energy or an estimated cost of the energy when performing the encryption operation.

Embodiment 7. The method of embodiment 1, 2, 3, 4, 5, and/or 6, wherein the encryption time is associated with lower energy costs.

Embodiment 8. The method of embodiment 1, 2, 3, 4, 5, 6, and/or 7, further comprising recommending the encryption module from among a plurality of available encryption modules.

Embodiment 9. The method of embodiment 1, 2, 3, 4, 5, 6, 7, and/or 8, further comprising performing the data at rest encryption operation with an available encryption module when the recommended encryption module does not satisfy encryption requirements of the storage system.

Embodiment 10. A method comprising: requesting a recommendation for performing a data in motion encryption operation at a storage system, wherein the recommendation is requested from an awareness engine that includes an encryption model configured to estimate an encryption time, wherein the recommendation includes the encryption time and/or an encryption module, encrypting the data using the encryption module recommended by the awareness engine and according to the encryption time, wherein the encryption time determined by the awareness engine accounts for an energy cost associated with performing the data at rest encryption operation, transmitting the encrypted data to a target storage system, decrypting the encrypted data at the target storage system, and storing the decrypted data at the target storage system.

Embodiment 11. The method of embodiment 11, wherein the encryption time comprises an encryption window and an estimated time to perform the encryption operation.

Embodiment 12. The method of embodiment 10 and/or 11, further comprising generating the encryption time by inputting features including weather features, and features of the storage system into a trained encryption module configured to predict the encryption time.

Embodiment 13. The method of embodiment 10, 11, and/or 12, further comprising waiting for the encryption time window to arrive prior to performing the encryption operation.

Embodiment 14. The method of embodiment 10, 11, 12, and/or 13, wherein the encryption time is generated by at least one machine learning model trained on data associated with historical data in motion encryption operations, historical energy costs, and factors influencing the energy costs.

Embodiment 15. The method of embodiment 10, 11, 12, 13, and/or 14, further comprising accounting for a source of energy or an estimated cost of the energy when performing the data in motion encryption operation.

Embodiment 16. The method of embodiment 10, 11, 12, 13, 14, and/or 15, wherein the encryption time is associated with lower energy costs.

Embodiment 17. The method of embodiment 10, 11, 12, 13, 14, 15, and/or 16, further comprising recommending the encryption module from among a plurality of available encryption modules.

Embodiment 18. The method of embodiment 10, 11, 12, 13, 14, 15, 16, and/or 17, further comprising performing the data in motion encryption operation with an available encryption module when the recommended encryption module does not satisfy encryption requirements of the storage system.

Embodiment 19. A method comprising: requesting a recommendation for performing an encryption operation to encrypt data at a storage system, wherein the recommendation is requested from an awareness engine that includes an encryption model configured to estimate an encryption time, wherein the recommendation includes the encryption time and/or an encryption module, encrypting the data using the encryption module recommended by the awareness engine and according to the encryption time, wherein the encryption time determined by an awareness engine accounts for an energy cost associated with performing the data at rest encryption operation, and storing the encrypted data at the storage system.

Embodiment 20. The method of claim 19, further comprising transmitting the encrypted data to a target storage system, decrypting the encrypted data, and storing the decrypted data at the target storage system.

Embodiment 21. A system, comprising hardware and/or software, operable to perform any of the operations, methods, or processes, or any portion of any of these, disclosed herein.

Embodiment 21. A non-transitory storage medium having stored therein instructions that are executable by one or more hardware processors to perform operations comprising the operations of any one or more of embodiments 1-20.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 4:
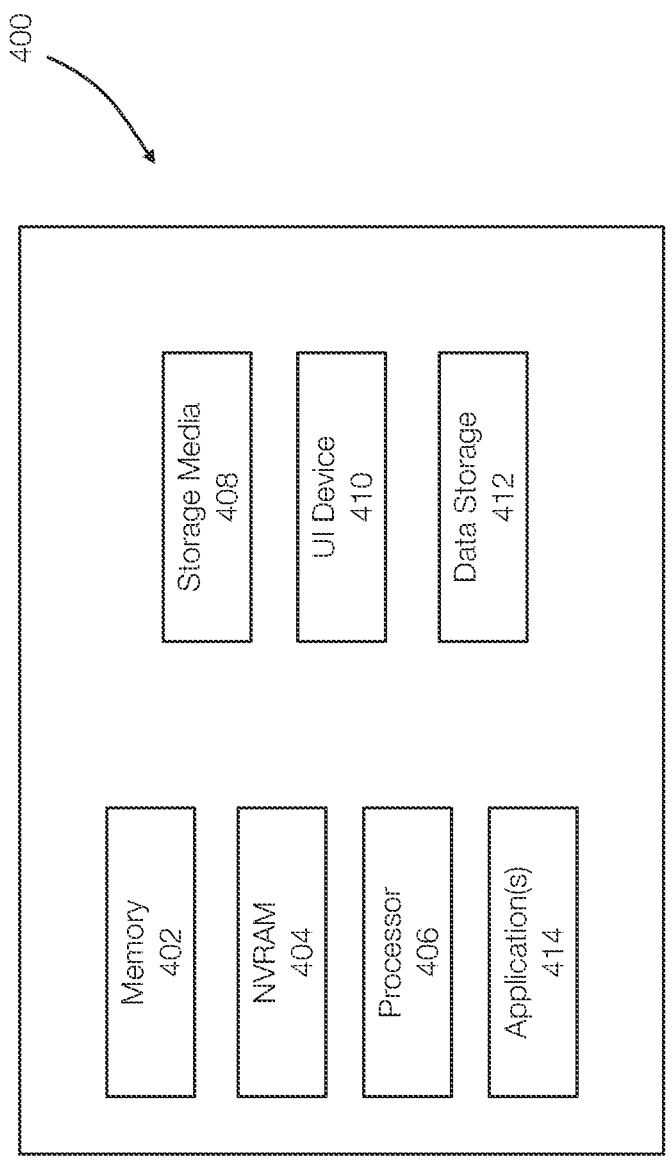
FIG. 4 discloses aspects of a computing device, system, or entity.

With reference briefly now to FIG. 4, any one or more of the entities disclosed, or implied, the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also be representative of servers, clusters of servers, nodes, or the like. The computing resources represented by the device 400 may represent the computing resources of a cloud provider that can be allocated or used for energy aware compression operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
 requesting a recommendation for performing a data at rest encryption operation to encrypt data at a storage system, wherein the recommendation is requested from an awareness engine that includes an encryption model configured to estimate an encryption time, wherein the recommendation includes the encryption time and/or an encryption module;
 encrypting the data using the encryption module recommended by an awareness engine and according to the encryption time, wherein the encryption time determined by the awareness engine accounts for an energy cost associated with performing the data at rest encryption operation; and
 storing the encrypted data at the storage system.

2. The method of claim 1, wherein the encryption time comprises an encryption time window and an estimated time to perform the encryption operation.

3. The method of claim 1, further comprising generating the encryption time by inputting features including weather features, and features of the storage system into a trained encryption module configured to predict the encryption time.

4. The method of claim 2, further comprising waiting for the encryption time window to arrive prior to performing the encryption operation.

5. The method of claim 1, wherein the encryption time is generated by at least one machine learning model trained on data associated with historical data at rest encryption operations, historical energy costs, and factors influencing the energy costs.

6. The method of claim 1, further comprising accounting for a source of energy or an estimated cost of the energy when performing the encryption operation.

7. The method of claim 1, wherein the encryption time is associated with lower energy costs.

8. The method of claim 1, further comprising recommending the encryption module from among a plurality of available encryption modules.

9. The method of claim 1, further comprising performing the data at rest encryption operation with an available encryption module when the encryption module recommended by the awareness engine does not satisfy encryption requirements of the storage system.

10. A method comprising:
 requesting a recommendation for performing a data in motion encryption operation at a storage system, wherein the recommendation is requested from an awareness engine that includes an encryption model configured to estimate an encryption time, wherein the recommendation includes the encryption time and/or an encryption module;
 encrypting the data using the encryption module recommended by an awareness engine and according to the encryption time, wherein the encryption time determined by the awareness engine accounts for an energy cost associated with performing the data at rest encryption operation;
 transmitting the encrypted data to a target storage system;
 decrypting the encrypted data at the target storage system; and
 storing the decrypted data at the target storage system.

11. The method of claim 10, wherein the encryption time comprises an encryption time window and an estimated time to perform the encryption operation.

12. The method of claim 10, further comprising generating the encryption time by inputting features including weather features, and features of the storage system into a trained encryption module configured to predict the encryption time.

13. The method of claim 11, further comprising waiting for the encryption time window to arrive prior to performing the encryption operation.

14. The method of claim 10, wherein the encryption time is generated by at least one machine learning model trained on data associated with historical data in motion encryption operations, historical energy costs, and factors influencing the energy costs.

15. The method of claim 10, further comprising accounting for a source of energy or an estimated cost of the energy when performing the data in motion encryption operation.

16. The method of claim 10, wherein the encryption time is associated with lower energy costs.

17. The method of claim 10, further comprising recommending the encryption module from among a plurality of available encryption modules.

18. The method of claim 17, further comprising performing the data in motion encryption operation with an available encryption module when the recommended encryption module does not satisfy encryption requirements of the storage system.

19. A non-transitory storage medium having stored therein instructions that are executable by one or more hardware processors to perform operations comprising:

requesting a recommendation for performing an encryption operation to encrypt data at a storage system, wherein the recommendation is requested from an awareness engine that includes an encryption model configured to estimate an encryption time, wherein the recommendation includes the encryption time and/or an encryption module;

encrypting the data using the encryption module recommended by the awareness engine and according to the encryption time, wherein the encryption time determined by an awareness engine accounts for an energy cost associated with performing the data at rest encryption operation; and storing the encrypted data at the storage system.

20. The non-transitory storage medium of claim 19, further comprising transmitting the encrypted data to a target storage system, decrypting the encrypted data, and storing the decrypted data at the target storage system.

* * * * *